(12) United States Patent (10) Patent No.: US 9,188,727 B2
Zhu et al. (45) Date of Patent: Nov. 17, 2015

(54) LIGHT GUIDE PLATE

(71) Applicant: Wistron Corporation, New Taipei (TW)

(72) Inventors: Yan-Fei Zhu, New Taipei (TW); Tao Lian, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 14/197,224

(22) Filed: Mar. 5, 2014

(65) Prior Publication Data

US 2015/0117053 A1 Apr. 30, 2015

(30) Foreign Application Priority Data

Oct. 30, 2013 (CN) .......................... 2013 1 0526667

(51) Int. Cl.
*G02B 6/00* (2006.01)
*F21V 8/00* (2006.01)
*G02F 1/1335* (2006.01)

(52) U.S. Cl.
CPC .............. *G02B 6/002* (2013.01); *G02B 6/0035* (2013.01); *G02F 1/133615* (2013.01)

(58) Field of Classification Search
None
See application file for complete search history.

(56) References Cited

U.S. PATENT DOCUMENTS 5,997,148 A * 12/1999 Ohkawa ........................ 362/619
6,139,163 A * 10/2000 Satoh et al. ................... 362/612
2007/0147070 A1 6/2007 Yang et al.
2007/0217224 A1 * 9/2007 Kao et al. ...................... 362/615
2008/0278659 A1 * 11/2008 Park ................................ 349/65
2009/0046480 A1 * 2/2009 Chen et al. ..................... 362/617
2010/0027293 A1 * 2/2010 Li ................................... 362/619
2010/0091520 A1 4/2010 Liao
2010/0103345 A1 * 4/2010 Kuo et al. ....................... 349/61
2010/0165658 A1 * 7/2010 Huang et al. .................. 362/606

(Continued)

FOREIGN PATENT DOCUMENTS

JP 9-113907 A * 5/1997
JP 2001-83513 A * 3/2001
JP 2005-285704 A * 10/2005

(Continued)

OTHER PUBLICATIONS

"Office Action of Taiwan Counterpart Application" with partial English translation, issued on Oct. 23, 2014, p. 1-p. 9, in which the listed references were cited.

*Primary Examiner* — Mike Stahl
(74) *Attorney, Agent, or Firm* — Jianq Chyun IP Office (57) ABSTRACT

A light guide plate including a plate body and a plurality of microstructures formed thereon is provided. The plate body has a light entrance surface, a light exit surface orthogonal to the light entrance surface, and at least one side surface neighboring the light exit surface and the light entrance surface. At least one light source is disposed near the light entrance surface, such that light generated by the light source enters the plate body through the light entrance surface and exits from the plate body through the light exit surface. The microstructures are arranged on the light entrance surface and the at least one side surface, and the microstructures on the light entrance surface are convex-shaped and the microstructures on the at least one side surface are concave-shaped.

30 Claims, 4 Drawing Sheets

(56) References Cited

U.S. PATENT DOCUMENTS

| | | | |
|---|---|---|---|
| 2010/0214509 A1* | 8/2010 | Sasaki et al. | 349/65 |
| 2010/0284202 A1* | 11/2010 | Pan et al. | 362/606 |
| 2011/0128756 A1* | 6/2011 | Cho et al. | 362/606 |
| 2012/0307519 A1* | 12/2012 | Sakai | 362/602 |
| 2013/0215361 A1 | 8/2013 | Wang | |

FOREIGN PATENT DOCUMENTS

| | | | |
|---|---|---|---|
| JP | 2008-140550 A | * | 6/2008 |
| TW | M282191 | * | 12/2005 |
| TW | 200725100 | | 7/2007 |
| TW | M385714 | | 8/2010 |

\* cited by examiner

LIGHT GUIDE PLATE

CROSS-REFERENCE TO RELATED APPLICATION

This application claims the priority benefit of China application serial no. 201310526667.0, filed on Oct. 30, 2013. The entirety of the above-mentioned patent application is hereby incorporated by reference herein and made a part of this specification.

BACKGROUND

1. Field of the Disclosure

The disclosure is related to a light guide plate.

2. Description of Related Art

Generally, a liquid crystal display (LCD) is composed of an LCD panel and a backlight module. With the twist of liquid crystal molecules and functions of polarizing plates, the transmittance are changed and causes brightness difference in different pixel regions, and thereby, an image can be displayed. Since the liquid crystal molecules do not emit light, a backlight module is needed to provide a light source. Along with the development trend toward being large-sized and thin, current backlight modules commonly utilize edge-type backlight modules. An edge-type backlight module can be combined with a light-emitting diode (LED) and a light guide plates to achieve an advantage of having a thinner thickness.

In order to obtain a better efficiency of the light generated by the light source after entering the light guide plate with a light entrance side of the light guide plate corresponding to a light source (i.e., the aforementioned LED) as well as to prevent hot spots occurring on the light guide plate due to alternation of brightness and darkness resulted from uneven light, persons related to the art has to further optimize the structure of the light guide plate.

SUMMARY

The disclosure provides a light guide plate capable of effectively solving an issue of side light-leakage by microstructures.

The disclosure is directed to a light guide plate having a plate body and a plurality of microstructures formed on the plate body. The plate body has a light entrance surface, a light exit surface and at least one side surface neighboring the light entrance surface and the light exit surface. The light entrance surface is orthogonal to light exit surface. At least one light source is disposed near the light entrance surface, such that light generated by the light source enters and exits from the plate body through the light entrance surface and the light exit surface respectively. The microstructures are distributed on the light entrance surface and the at least one side surface. The microstructures located on the light entrance surface are convex-shaped, and the microstructures located on the at least one side surface are concave-shaped.

In an embodiment of the disclosure, each of the microstructures located on the light entrance surface is at least a portion of a cylindrical surface.

In an embodiment of the disclosure, each of the microstructures located on the at least one side surface is at least a potion of a cylindrical surface.

In an embodiment of the disclosure, each of the microstructures located on the at least one side surface is at least a portion of an ellipsoidal surface.

In an embodiment of the disclosure, each of the microstructures located on the at least one side surface is at least a portion of a spherical surface.

In an embodiment of the disclosure, the microstructures located on the at least one side surface are arranged from the light entrance surface toward an opposite thereof with the microstructures spaced with an equal interval from one another.

In an embodiment of the disclosure, the microstructures located on the at least one side surface are arranged from the light entrance surface toward an opposite thereof with the microstructures spaced from one another in an interval that is progressively increased with an arrangement direction of the microstructures.

In an embodiment of the disclosure, the interval among the microstructures located on the at least one side surface is increased in an arithmetic progression with the arrangement direction.

In an embodiment of the disclosure, the interval among the microstructures located on the at least one side surface is increased in a geometric progression with the arrangement direction.

In an embodiment of the disclosure, the microstructures located on the at least one side surface are arranged from the light entrance surface toward an opposite thereof, each of the microstructures is progressively decreased with an arrangement direction thereof along a size in an axial direction, and the axial direction is a normal direction of the light exit surface and/or a normal direction of the light entrance surface.

In an embodiment of the disclosure, wherein the microstructures located on the at least one side surface are arranged from the light entrance surface toward an opposite thereof, and a distribution density of the microstructures is progressively increased with the arrangement direction thereof.

In an embodiment of the disclosure, the microstructures located on the at least one side surface are divided into a plurality of first microstructures and a plurality of second microstructures, the first microstructures and the second microstructures are alternately arranged, a size of each of the first microstructures along an axial direction is different from a size of each of the second microstructures along the axial direction, and the axial direction is a normal direction of the light exit surface and/or a normal direction of the light entrance surface.

To sum up, in the embodiments of the disclosure, with the microstructures of the light guide plate which are distributed on the light entrance surface and the at least one side surface, not only the light entering the plate body can become more even corresponding to the light source located near the light entrance surface, but also the light can be effectively prevented from light leakage due to the light exiting from the light guide plate nit through the light exit surface during the process of the light being transmitted in the light guide plate. Thereby, transmission efficiency of the light in the light guide plate can be effectively improved.

In order to make the aforementioned and other features and advantages of the disclosure more comprehensible, several embodiments accompanied with figures are described in detail below.

BRIEF DESCRIPTION OF THE DRAWINGS

Although the disclosure has been described with reference to the above embodiments, it will be apparent to one of the ordinary skill in the art that modifications to the described embodiment may be made without departing from the spirit of the disclosure. Accordingly, the scope of the disclosure will be defined by the attached claims not by the above detailed descriptions.

DESCRIPTION OF EMBODIMENTS

Figure 1:
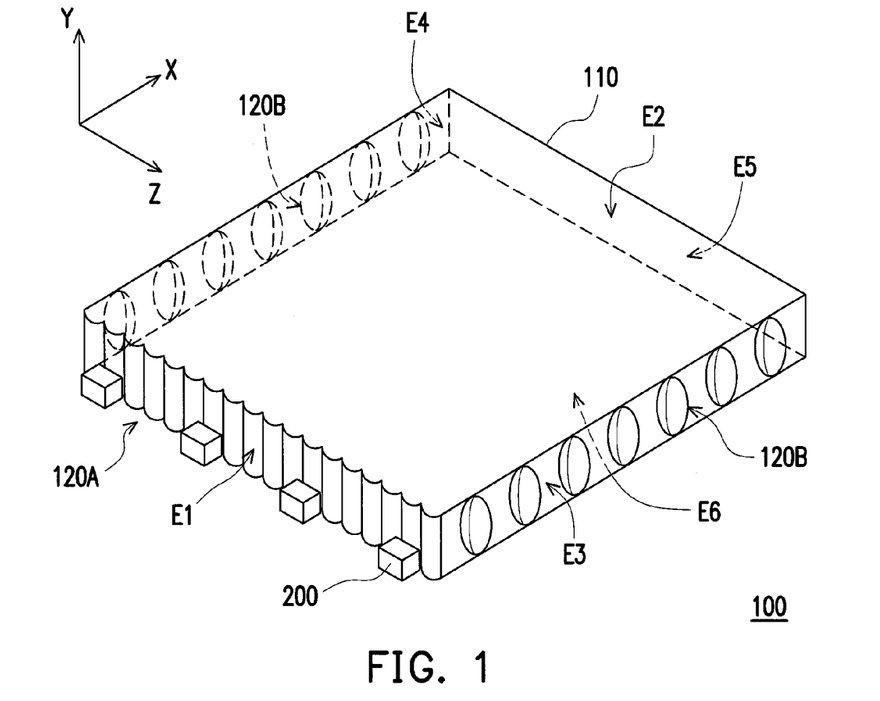
FIG. 1 is a schematic diagram illustrating a light guide plate according to an embodiment of the disclosure.

FIG. 1 is a schematic diagram illustrating a light guide plate according to an embodiment of the disclosure. With reference to FIG. 1, in the present embodiment, a light guide plate 100 consists of a plate body 110 and a plurality of microstructures 120A and 120B formed on the plate body 110. Here, a Cartesian coordinate system is provided for the convenience of describing characteristics related to the light guide plate 100. The plate body 110 is located on an X-Z plane and thickness thereof extends along the Y axis. The plate body 110 has a light entrance surface E1, a light exit surface E2, side surfaces E3, E4 and E5 and a bottom surface E6. The light entrance surface E1 is orthogonal to the light exit surface E2, the side surface E5 is opposite to the light entrance surface E1, the bottom surface E6 is opposite to the light exit surface E2, both the light exit surface E2 and the bottom surface E6 use the Y axis as a normal thereof, both the light entrance surface E1 and the side surface E5 (opposite to the light entrance surface E1) use the X axis as a normal thereof.

The light source 200 includes, for example, a plurality of light emitting diodes (LEDs) and is disposed near the light entrance surface E1. Light generated by the light source 200 enters the plate body 110 through the light entrance surface E1 and exits from the plate body 110 through the light exit surface E2. The microstructures 120A are formed on the light entrance surface E1, and the microstructures 120B are formed on the side surfaces E3 and E4. The microstructures 120A located on the light entrance surface E1 are convex-shaped, and the microstructures 120B located on the side surfaces E3 and E4 are concave-shaped.

Generally, in order to allow the light guide plate 100 to generate light with even brightness from the light exit surface E2, the microstructures 120A and 120B are correspondingly formed on the plate body 110 according to characteristics of the light source 200. In the present embodiment, each of the microstructures 120A formed on the light entrance surface E1 is at least a portion of a cylindrical surface and illustrated as a semi-cylinders in FIG. 1 for example, but the disclosure is not limited thereto, such that the light generated by the light source 200 may be effectively gathered and enter the plate body 110 through the light entrance surface E1 to avoid a hot spot situation with bright and dark spots alternated due to difference disposition statuses of the light source 200.

Additionally, as the above description, when the even light is formed, an issue of side light-leakage occurring therefrom has to be settled down. In the present embodiment, even through the hot spot issue may be solved with the semi-cylindrical microstructures 120A formed on the light entrance surface E1, a linear light-leakage occurs correspondingly on the side surfaces E3 and E4. Therefore, in the present embodiment, the microstructures 120B are further formed on the side surfaces E3 and E4 of the plate body 110 of the light guide plate 100. It should be mentioned that the side surfaces E3 and E4 are two symmetrical surfaces of the plate body 110, and thus, the microstructures 120B distributed on the side surfaces E3 and E4 are also the same. Therefore, in the later description, the side surface E3 and the microstructures 120B located thereon will be served as the representative for description.

Figure 2:
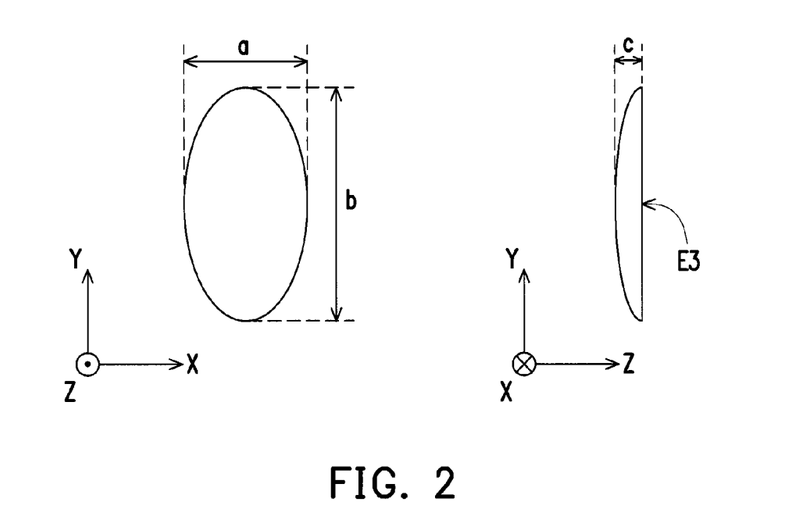
FIG. 2 is a schematic view showing projections of the microstructures B illustrated in FIG. 1.

In the present embodiment, each of the microstructures 120B located on the side surface E3 is concave-shaped and at least a portion of an ellipsoidal surface. FIG. 2 is a schematic view showing projections of the microstructures 120B illustrated in FIG. 1, where the left shows a projection of the microstructure 120B on an X-Y plane, and the right shows a projection of the microstructure 120B on a Y-Z plane. Referring to FIG. 1 and FIG. 2 simultaneously, a dimension of the microstructure 120B along the X axis is a, a dimension along the Y axis is b and a dimension along the Z axis (i.e., a depth of the microstructure 120B concaving inward) is c. In order for the microstructures 120B to achieve the aforementioned purpose to prevent the light leakage from the side surfaces, the dimensions have to satisfy a condition of b<t, a≤b and c≤t/2, where t is a dimension of the plate body 110 along the Y axis.

Figure 3:
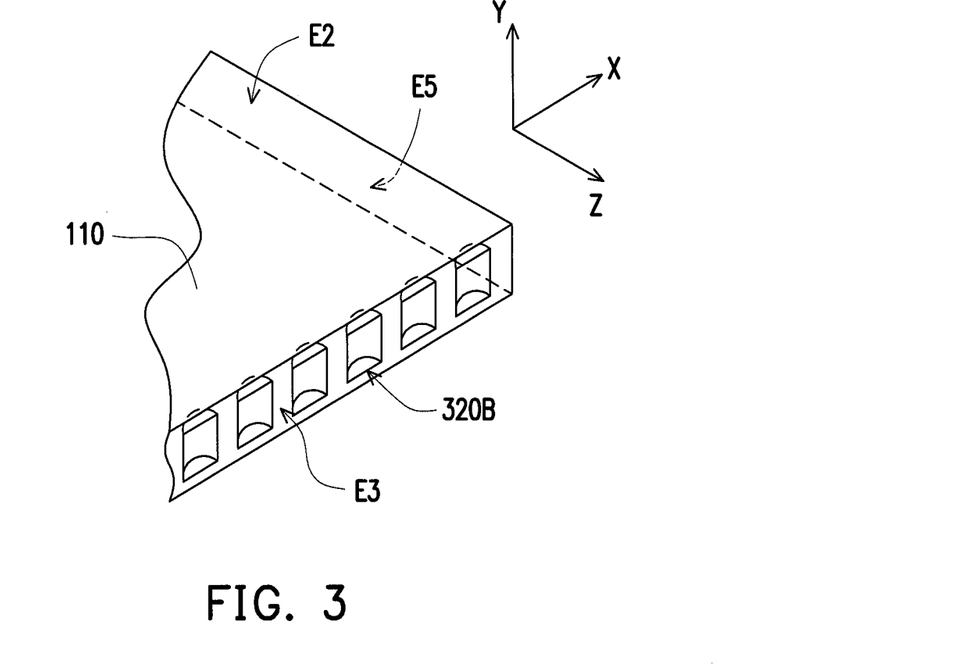
FIG. 3 and FIG. 4 are partially schematic diagrams illustrating light guide plates according to different embodiments of the disclosure.
Figure 4:
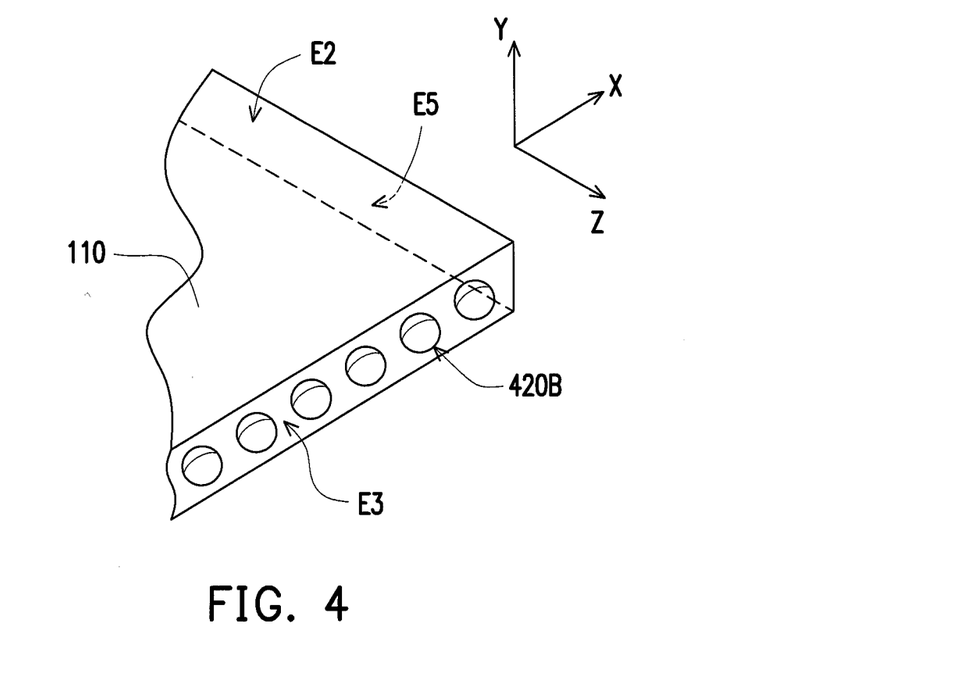

FIG. 3 and FIG. 4 are partially schematic diagrams illustrating light guide plates according to different embodiments of the disclosure. With reference to FIG. 3 and FIG. 4, differing from the above embodiment, each microstructure 320B of the embodiment illustrated in FIG. 3 is concave-shaped (which are concaved inward along the negative Z-axial direction) and at least a portion of a cylindrical surface, which is illustrated as a semi-cylindrical surface (i.e., a=2c) for example in this case. Each microstructure 420B of the embodiment illustrated in FIG. 4 is concave-shaped (which are concaved inward along the negative Z-axial direction) and at least a portion of a spherical surface, which is illustrated as a semi-spherical surface (i.e., a=b=2c) for example in this case. In other words, the microstructures 320B and 420B illustrated in FIG. 3 and FIG. 4 also satisfy the condition of the dimensions along the X axis, the Y axis and the Z axis and can achieve the effect of preventing the light being leaked out of the plate body 110 from the side surface E3.

Statuses of the microstructures arrangement on the side surfaces are described in detail as below.

Figure 5:
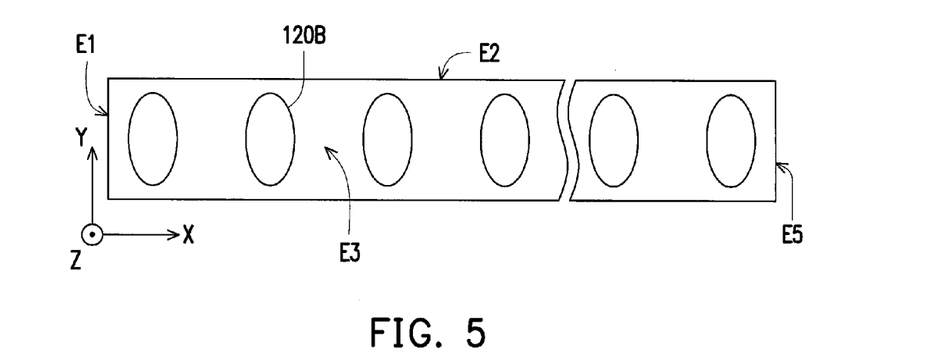
FIG. 5 is a side view of the light guide plate illustrated in FIG. 1.

FIG. 5 is a side view of the light guide plate illustrated in FIG. 1. Referring to FIG. 1 and FIG. 5 simultaneously, in the present embodiment, each of the microstructures 120B is illustrated as an ellipsoidal surface for example, which may also be replaced by a semi-cylindrical surface and/or semi-spherical surface to produce the similar effect. In the present embodiment, the microstructures 120B on the side surface E3 are arranged from light entrance surface E1 toward the side surface E5 (i.e., an opposite of the light entrance surface E1 along the X axis), and namely, the microstructures 120B are arranged along the positive X-axial direction with an equal interval from on another.

Figure 6:
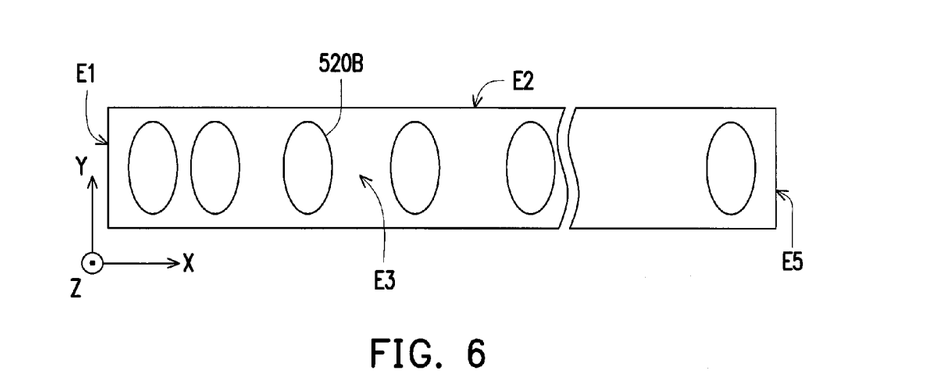
FIG. 6 is a schematic illustrating a disposition of microstructures on the light guide plate according to another embodiment of the disclosure

FIG. 6 is a schematic illustrating a disposition of microstructures on the light guide plate according to another embodiment of the disclosure, which is used to illustrate the disposition of the microstructures on the side surface. With reference to FIG. 6, differing from the above embodiment, each microstructure 520B located on the side surface E3 are arranged from the light entrance surface E1 toward the side surface E5 (i.e., along the positive X-axial direction), and the interval between each of the microstructures 520B is progressively increased along the arrangement direction (i.e., along the positive X-axial direction). Here, the increase proportion of the interval is not limited, and the interval can be progressively increased in an arithmetic progression or a geometric progression.

Figure 7:
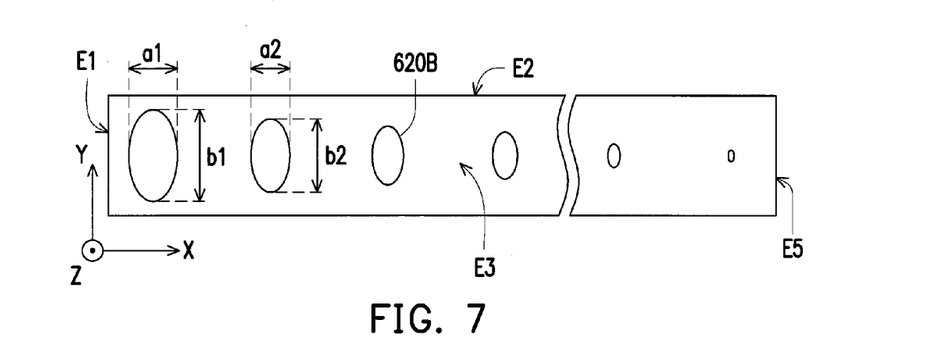
FIG. 7 is a schematic illustrating a disposition of microstructures on the light guide plate according to still another embodiment of the disclosure.

FIG. 7 is a schematic illustrating a disposition of microstructures on the light guide plate according to still another embodiment of the disclosure, which is used to illustrate the disposition of the microstructures on the side surface. With reference to FIG. 7, each microstructure 620B of the present embodiment is arranged from the light entrance surface E1 toward the side surface E5 (i.e., along the positive X-axial direction) with an equal interval from each other like the way illustrated in FIG. 5. However, a dimension of each of the microstructures 620B along the Y axis, i.e., the dimension b, is progressively decreased along the arrangement direction (i.e., along the positive X-axial direction), while a dimension of each of the microstructures 620B along the X axis, i.e., the dimension a, is also progressively decreased along the arrangement direction. For instance, the microstructure 620B adjacent to the light entrance surface E1 a dimension a1 along the X axis greater than a dimension a2 of the microstructure 620B away from the light entrance surface E2 and a dimension b1 along the Y axis greater than a dimension b2 of the microstructure away from the light entrance surface E2. In other words, in the present embodiment, the dimension along an axis of each of the microstructures 620B is progressively decreased with the arrangement direction, where the axis as referred to is the normal direction (i.e., the Y-axial direction) of the light exit surface E2 and/or the normal direction (i.e., the X-axial direction) of the light entrance surface E1.

Figure 8:
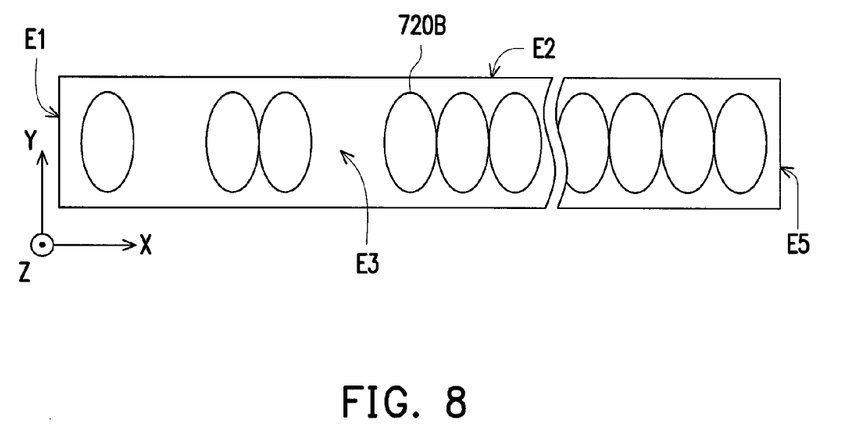
FIG. 8 is a schematic illustrating a disposition of microstructures on the light guide plate according to yet another embodiment of the disclosure.

FIG. 8 is a schematic illustrating a disposition of microstructures on the light guide plate according to yet another embodiment of the disclosure. In the present embodiment, each microstructure 720B is arranged from the light entrance surface E1 toward the side surface E5 (i.e., along the positive X-axial direction) with a progressively increased density.

Figure 9:
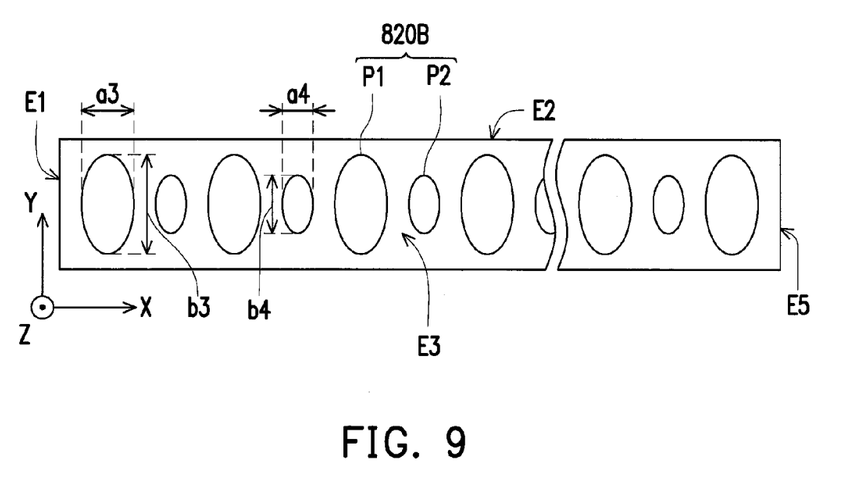
FIG. 9 is a schematic illustrating a disposition of microstructures on the light guide plate according to further another embodiment of the disclosure.

FIG. 9 is a schematic illustrating a disposition of microstructures on the light guide plate according to further another embodiment of the disclosure. In the present embodiment, microstructures 820B include a plurality of first microstructures P1 and a plurality of second microstructures P2, the first microstructures P1 and the second microstructures P2 are alternately arranged, a dimension (i.e., the dimension b) of each first microstructure P1 along the Y axis is different from a dimension (i.e., the dimension a) of each second microstructure P2 along the Y axis and/or along the X axis. Moreover, in the present embodiment, a dimension b3 of each first microstructure P1 along the Y axis is greater than a dimension b4 of each second microstructure P2 along the Y axis and/or a dimension a3 of each first microstructure P1 along the X axis is greater than a dimension a4 of each second microstructure P2 along the X axis. In other words, in the present embodiment, the dimension of each first microstructure P1 along one axis is different from of the dimension of each second microstructure P2 along the axis. The axis referred to herein is the normal direction of the light exit surface E2 and/or the normal direction of the light entrance surface E1.

Based on the above, with the microstructures disposed on the side surfaces E3 and E4 of the plate body, changing either the shapes or the arrangements of the microstructures facilitates in reducing the situation of side light-leakage. Accordingly, in the below, optical simulations are provided to simulate the shapes and the arrangements of the microstructures for proving effects that may be produce thereby.

For instance, the embodiment illustrated in FIG. 1 is served as a simulation object where the microstructures 120A are disposed on the light entrance surface E1, and microstructures (e.g., the different shapes and arrangements as listed in Item 1 through Item 10 in the below table) that are different therefrom are disposed on the side surface E3 while another light guide plate (not shown) where the microstructures 120A are also disposed on the light entrance surface E1 but no microstructures 120B are disposed on the side surface E3 is served as the control group. Additionally, the semi-cylindrical microstructures 120A are served as the descriptive objects, whose radius is 0.06 mm, a dimension along the Y axis is 0.58 mm, and an arrangement interval along the Z axis is 0.16 mm. In the meantime, a simulated number of rays is 30 million, and an optimization degree is defined as optimization degree=1-AVE1/AVE2, where AVE1 is an average illuminance adopted for the microstructures 120B located on the side surface E3, while AVE2 is an average illuminance that no microstructures 120B are disposed on the side surface E3, and the unit of the illuminance is lux. The shape and the arrangement of each microstructure are listed as below.

| Item | Shape | Dimension (mm) | Arrangement | Average illuminance (lux) | Optimization degree |
|---|---|---|---|---|---|
| Control group | — | — | — | 416800 | — |
| 1 | Semi-cylindrical concave surface | a = c = 0.04 b = 0.5 | With an equal interval (the interval is 0.16 mm) | 320900 | 23% |
| 2 | Semi-cylindrical concave surface | a = c = 0.04 b = 0.4 | With an equal interval (the interval is 0.16 mm) | 348000 | 17% |
| 3 | Semi-ellipsoidal concave surface | a = 0.21 b = 0.50 c = 0.21 | With an equal interval (the interval is 1.5 mm) | 332800 | 20% |

-continued

| Item | Shape | Dimension (mm) | Arrangement | Average illuminance (lux) | Optimization degree |
|---|---|---|---|---|---|
| 4 | Semi-ellipsoidal concave surface | a = 0.21 b = 0.50 c = 0.08 | With an equal interval (the interval is 1.5 mm) | 366100 | 12% |
| 5 | Semi-ellipsoidal concave surface | a = 0.21 b = 0.50 c = 0.05 | With an equal interval (the interval is 1.5 mm) | 347700 | 17% |
| 6 | Semi-ellipsoidal concave surface | a = 0.21 b = 0.50 c = 0.21 | With a progressively increased interval | 414300 | 1% |
| 7 | Semi-ellipsoidal concave surface | a = 0.21 b = 0.50 c = 0.21 | With the number (density) progressively increased with the distance | 324200 | 22% |
| 8 | Semi-ellipsoidal concave surface | a = 0.21 b = 0.50 c = 0.21 | With the dimension (b) progressively decreased with the distance | 407000 | 2% |
| 9 | Semi-ellipsoidal concave surface | a = 0.21 b = 0.50 c = 0.21 | With an equal interval (the interval is 1.5 mm) while the dimension (b) is progressively decreased | 356900 | 14% |
| 10 | Semi-ellipsoidal concave surface | a = 0.21 b = 0.50 c = 0.21 | With an equal interval (the interval is 1.5 mm) while the dimension (b) is varied | 343900 | 17% |

Accordingly, according to the above table, a designer may adaptively combine the characteristics listed above, i.e., by adaptively adjusting the shapes, the dimensions and the arrangements of the microstructures disposed located on the side surface, to obtain better optimization degrees.

To sum up, in the embodiments of the disclosure, with the microstructures disposed on the light entrance surface of the light guide plate, the light generated by the light source after entering the light guide plate can generate the light with even brightness from the light exit surface. Moreover, with the microstructures disposed on the side surfaces the leakage of the light in the light guide plate from the side surfaces can be mitigated. Accordingly, the disclosure can effectively increase the transmission efficiency of the light in the light guide plate.

Furthermore, the microstructures located on the light entrance surface are convex-shaped, such that the light generated by the light source can be gathered on the light guide plate while the microstructures located on the side surface are concave-shaped which feature in that the light transmitted to the side surfaces can be reflected back into the light guide plate, such that the light is prevented from exiting from the light guide plate through the side surfaces. By doing so, with different shapes, dispositions and arrangements of the microstructures, the light leakage from the side surfaces can be effectively reduced to achieve optimization.

Although the disclosure has been described with reference to the above embodiments, it will be apparent to one of the ordinary skill in the art that modifications to the described embodiment may be made without departing from the spirit of the disclosure. Accordingly, the scope of the disclosure will be defined by the attached claims not by the above detailed descriptions.

What is claimed is:

1. A light guide plate, comprising:
a plate body, having a light entrance surface, a light exit surface and at least one side surface neighboring the light entrance surface and the light exit surface, wherein the light entrance surface is orthogonal to the light exit surface, at least one light source is disposed near the light entrance surface for generating light entering the plate body through the light entrance surface and exiting from the plate body through the light exit surface; and
a plurality of microstructures, formed on the plate body and distributed on the light entrance surface and the at least one side surface, wherein the microstructures located on the light entrance surface are convex-shaped, and the microstructures located on the at least one side surface are concave-shaped,
wherein the microstructures located on the at least one side surface are arranged from the light entrance surface toward an opposite thereof with the microstructures spaced from one another in an interval that is progressively increased with an arrangement direction of the microstructures.

2. The light guide plate according to claim 1, wherein each of the microstructures located on the light entrance surface is at least a portion of a cylindrical surface.

3. The light guide plate according to claim 2, wherein each of the microstructures located on the at least one side surface is at least a portion of a cylindrical surface.

4. The light guide plate according to claim 2, wherein each of the microstructures located on the at least one side surface is at least a portion of an ellipsoidal surface.

5. The light guide plate according to claim 2, wherein each of the microstructures located on the at least one side surface is at least a portion of a spherical surface.

6. The light guide plate according to claim 3, wherein the microstructures located on the light entrance surface are arranged with an equal interval from one another.

7. The light guide plate according to claim 4, wherein the microstructures located on the light entrance surface are arranged with an equal interval from one another.

8. The light guide plate according to claim 5, wherein the microstructures located on the light entrance surface are arranged with an equal interval from one another.

9. The light guide plate according to claim 1, wherein the interval among the microstructures located on the at least one side surface is increased in an arithmetic progression with the arrangement direction.

10. The light guide plate according to claim 1, wherein the interval among the microstructures located on the at least one side surface is increased in a geometric progression with the arrangement direction.

11. The light guide plate according to claim 1, wherein the microstructures located on the at least one side surface are arranged from the light entrance surface toward an opposite thereof, each of the microstructures is progressively decreased with an arrangement direction thereof along a size in an axial direction, and the axial direction is a normal direction of the light exit surface and/or a normal direction of the light entrance surface.

12. The light guide plate according to claim 1, wherein the microstructures located on the at least one side surface are divided into a plurality of first microstructures and a plurality of second microstructures, the first microstructures and the second microstructures are alternately arranged, a size of each of the first microstructures along an axial direction is different from a size of each of the second microstructures along the axial direction, and the axial direction is a normal direction of the light exit surface and/or a normal direction of the light entrance surface.

13. The light guide plate according to claim 1, wherein each of the microstructures located on the at least one side surface is at least a portion of a cylindrical surface.

14. The light guide plate according to claim 1, wherein each of the microstructures located on the at least one side surface is at least a portion of an ellipsoidal surface.

15. The light guide plate according to claim 1, wherein each of the microstructures located on the at least one side surface is at least a portion of a spherical surface.

16. The light guide plate according to claim 1, wherein the microstructures located on the light entrance surface are arranged with an equal interval from one another.

17. A light guide plate, comprising:
a plate body, having a light entrance surface, a light exit surface and at least one side surface neighboring the light entrance surface and the light exit surface, wherein the light entrance surface is orthogonal to the light exit surface, at least one light source is disposed near the light entrance surface for generating light entering the plate body through the light entrance surface and exiting from the plate body through the light exit surface; and
a plurality of microstructures, formed on the plate body and distributed on the light entrance surface and the at least one side surface, wherein the microstructures located on the light entrance surface are convex-shaped, and the microstructures located on the at least one side surface are concave-shaped,
wherein the microstructures located on the at least one side surface are arranged from the light entrance surface toward an opposite thereof, and a distribution density of the microstructures is progressively increased with the arrangement direction thereof.

18. The light guide plate according to claim 17, wherein each of the microstructures located on the light entrance surface is at least a portion of a cylindrical surface.

19. The light guide plate according to claim 18, wherein each of the microstructures located on the at least one side surface is at least a portion of a cylindrical surface.

20. The light guide plate according to claim 18, wherein each of the microstructures located on the at least one side surface is at least a portion of an ellipsoidal surface.

21. The light guide plate according to claim 18, wherein each of the microstructures located on the at least one side surface is at least a portion of a spherical surface.

22. The light guide plate according to claim 19, wherein the microstructures located on the light entrance surface are arranged with an equal interval from one another.

23. The light guide plate according to claim 20, wherein the microstructures located on the light entrance surface are arranged with an equal interval from one another.

24. The light guide plate according to claim 21, wherein the microstructures located on the light entrance surface are arranged with an equal interval from one another.

25. The light guide plate according to claim 17, wherein the microstructures located on the at least one side surface are arranged from the light entrance surface toward an opposite thereof, each of the microstructures is progressively decreased with an arrangement direction thereof along a size in an axial direction, and the axial direction is a normal direction of the light exit surface and/or a normal direction of the light entrance surface.

26. The light guide plate according to claim 17, wherein the microstructures located on the at least one side surface are divided into a plurality of first microstructures and a plurality of second microstructures, the first microstructures and the second microstructures are alternately arranged, a size of each of the first microstructures along an axial direction is different from a size of each of the second microstructures along the axial direction, and the axial direction is a normal direction of the light exit surface and/or a normal direction of the light entrance surface.

27. The light guide plate according to claim 17, wherein each of the microstructures located on the at least one side surface is at least a portion of a cylindrical surface.

28. The light guide plate according to claim 17, wherein each of the microstructures located on the at least one side surface is at least a portion of an ellipsoidal surface.

29. The light guide plate according to claim 17, wherein each of the microstructures located on the at least one side surface is at least a portion of a spherical surface.

30. The light guide plate according to claim 17, wherein the microstructures located on the light entrance surface are arranged with an equal interval from one another.

* * * * *